United States Patent
Van Der Stoel

[11] Patent Number: 5,917,895
[45] Date of Patent: Jun. 29, 1999

[54] ADJUNCT ARRANGEMENT FOR A TELECOMMUNICATION DEVICE

[75] Inventor: Simon J. Van Der Stoel, Veldhoven, Netherlands

[73] Assignee: U.S. Philips Corporation, New York, N.Y.

[21] Appl. No.: 08/862,211

[22] Filed: May 22, 1997

[30] Foreign Application Priority Data

May 28, 1996 [EP] European Pat. Off. .............. 96201467

[51] Int. Cl.$^6$ ................................................. H04M 11/00
[52] U.S. Cl. .................................... 379/93.09; 379/93.34; 379/100.16
[58] Field of Search .............................. 379/93.05–93.07, 379/93.09, 93.34–93.37, 100.15, 100.16, 399, 387, 414

[56] References Cited

U.S. PATENT DOCUMENTS 4,812,785  3/1989  Pauker .
5,473,676  12/1995  Frick et al. ................................. 379/99
5,506,891  4/1996  Brown ................................... 379/93.34

Primary Examiner—Wing F. Chan

[57] ABSTRACT

From facsimile selectors, for instance, adjunct arrangements are known having a muting function for muting a telephone conversation when sending fax data. An adjunct arrangement is described having a low power consumption while at the same time strongly muting a voice communication so that it can easily be battery operated. To this end, in mute mode, the adjunct arrangement has a gyrator that is switched in series with a telephone set, the series circuit being switched parallel to the telephone network. In mute mode, the adjunct arrangement further has a capacitor switched parallel to the telephone set. Furthermore, in mute mode, data is exchanged between the network and the adjunct arrangement by coupling a data receiver and/or transmitter to the telephone line.

5 Claims, 1 Drawing Sheet

5,917,895

ADJUNCT ARRANGEMENT FOR A TELECOMMUNICATION DEVICE

BACKGROUND OF THE INVENTION

The present invention relates to an adjunct arrangement for a telecommunication device to be coupled between a telecommunication network supporting voice and data services and the telecommunication device, which adjunct arrangement comprises switching means for switching the telecommunication device between a mute mode and a voice mode, whereby the data service is supported when the telecommunication device is in the mute mode.

Adjunct arrangements of this kind are known. Such a known adjunct arrangement is coupled between a telecommunication network such as an analog public switched telephone network and a telecommunication device such an ordinary analog telephone set for voice communication with the network and is used for suppressing the speech from the network to the telephone set and vice versa, when the data services have to be supported during a voice communication. In this so-called mute mode, the adjunct arrangement can exchange data signals with the telecommunication network. The voice communication is only interrupted for short periods of time, typically five seconds at most each time when the voice communication is interrupted. The data service is thus provided in the form of so-called off-hook signalling. Network operators impose requirements upon such off-hook signalling, both hardware requirements such as network termination requirements and software requirements such as network protocol requirements. A typical data service implemented by means of off-hook signalling is a call waiting service provided to a party trying to call a party being in a voice communication with another party. During such a call waiting service, the network sends a call alert signal in the form of a short tone to the party whose call is intruded. Thereupon, the telephone set of this party is muted and the set sends an acknowledge signal to the network supporting the call waiting service. The network may then send a short data stream to the adjunct arrangement of the party whose call is intruded so as to inform this party of the identity of the intruding party. Also other services can be provided. When using an adjunct arrangement for muting a voice communication so as to exchange data, at least some of several requirements have to be met. Usually analog telephone sets have no own DC-supply but get their DC-supply from the network. The adjunct arrangement has a separate DC-supply, preferably a battery. When the separate DC-supply fails, the default settings of the adjunct arrangement should be such that the telephone set is still able to fulfill its voice communication task. When the adjunct arrangement is switched into the mute mode, electrically the telephone set should see as few changes as possible. Furthermore, the adjunct arrangement must meet network operator's requirements such as the FCC part 68 requirements in the USA or similar requirements elsewhere. Also, when in mute mode, the muting should be as good as possible, or should at least fulfill local requirements such as the Bellcore SR-3004 requirements as to attenuation. Although known adjunct arrangements could meet the above requirements, such known adjunct arrangements have disadvantages. In one known adjunct arrangement, in mute mode, a DC-current source supplied by the adjunct arrangement's battery is switched parallel to the telephone set, a termination impedance matching the set's impedance being switched parallel to the current source, whereas a gyrator circuit is switched across the network's terminals. In the known adjunct arrangement mode switching is done by means of a relay also requiring supply from the adjunct arrangement's battery. The battery of such an adjunct arrangement will be exhausted quickly so that the adjunct arrangement is impractical when used. Furthermore, because of the relatively high line-voltage that has to be supplied to the telephone set when in mute-mode, the DC-supply is complicated and expensive.

OBJECTS AND SUMMARY OF THE INVENTION

It is an object of the present invention to provide an adjunct arrangement for a telecommunication device that has a low power consumption, that is simple in construction and that is low cost.

To this end the adjunct arrangement according to the present invention is characterized in that the adjunct arrangement comprises a first impedance and a second impedance, the first impedance having a low impedance value with respect to an impedance value of the second impedance in a given frequency range, the switching means being arranged for switching the first impedance parallel to the telecommunication device and for switching the second impedance and the telecommunication device in series and parallel to the telecommunication network when the telecommunication device is switched into the mute mode. The present invention is based upon the insight that in the mute mode the required strong muting is achieved by voltage division of two impedances having a low and a high impedance value while at the same time the telephone set is properly terminated and no separate supply is needed for supplying the telephone set in the mute mode. Herewith, the adjunct arrangement can be designed for long-life battery operation, typically one year when operated by 4 1.5V battery cells.

In an embodiment of an adjunct arrangement according to the present invention, the second impedance is an electronic coil in the form of a gyrator circuit. That a gyrator may be used in series with the telecommunication device, despite of the fact that it's impedance might be considered to high for muting purposes, is based upon the insight that the FCC part 68 allows the loop current to decrease with a maximum of 25 per cent from its nominal value during a short period of time of a maximum of five seconds. A gyrator can easily be fed by batteries or by a network adapter of relatively low power. Herewith, the adjunct box can be designed to have small dimensions and to be light-weighted because no bulky components are required.

In an embodiment of an adjunct arrangement according to the present invention, the second impedance is a passive coil. This embodiment is very simple but requires a bulky coil so as to achieve a near-ideal coil needed for passing DC-line currents when the adjunct arrangement is in mute mode.

In an embodiment of an adjunct arrangement according to the present invention, the first impedance is a capacitor. Herewith, a trade-off is made between maximum muting and proper termination of the telecommunication device in mute mode. Would a better termination of the set be made by putting a resistor in series with the capacitor, for instance, then the muting would be worse.

In an embodiment of an adjunct arrangement according to the present invention, the adjunct arrangement comprises a third impedance having an impedance value substantially equal to an impedance value of the telecommunication network at the side of the adjunct arrangement, the switching means being arranged to switch the third impedance parallel to the telecommunication network when the telecommunication device is switched into the mute mode. Herewith, data signals can be sent to the network while still terminating the network properly. Such data signals include an acknowledgement signal to a call alert signal from the network, but may even include full data communication in burst mode during mute periods such as E-mail data from a personal computer connected to the adjunct arrangement, or the like.

In an embodiment of an adjunct arrangement according to the present invention, the switching means include a relay of a set-reset type. Herewith, the adjunct arrangement's power consumption is still further reduced though at the cost of a more expensive relay than when using a continuously actuated relay when in mute mode.

BRIEF DESCRIPTION OF THE DRAWINGS

The present invention will now be described, by way of example, with reference to the accompanying drawings, wherein.

Throughout the figures the same reference numerals are used for the same features.

DETAILED DESCRIPTION OF THE PREFERRED EMBODIMENT

Figure 1:
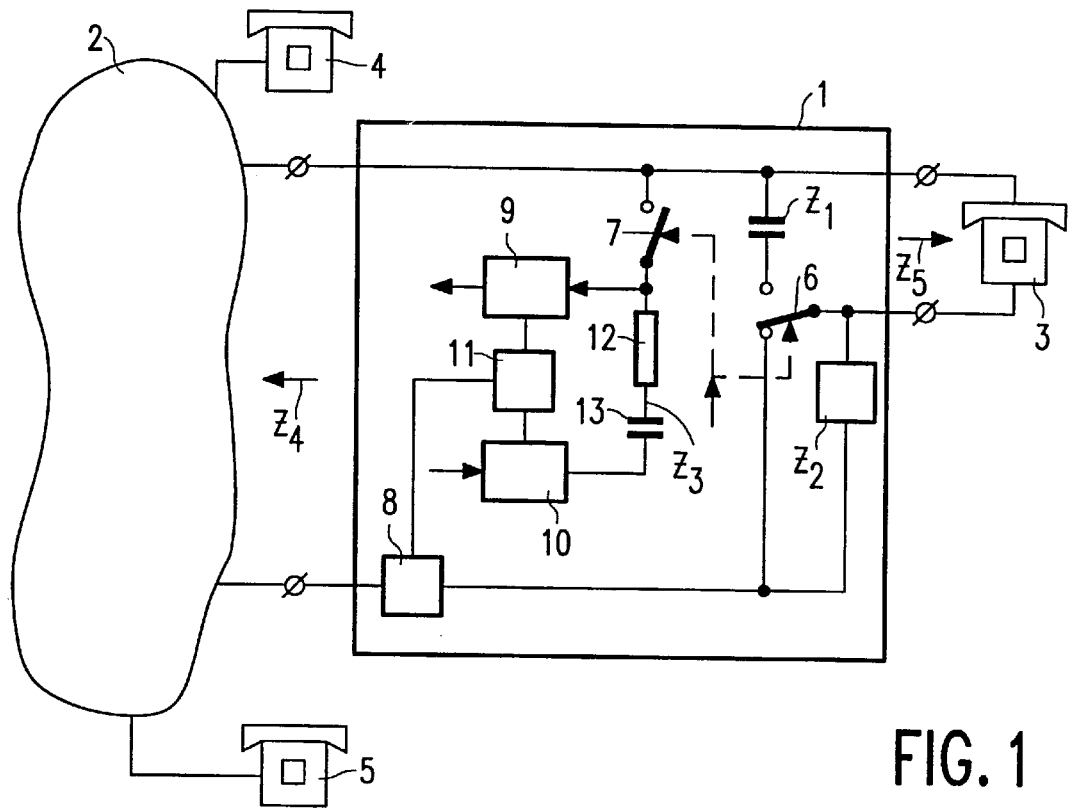
FIG. 1 shows a block diagram of an adjunct arrangement according to the present invention coupled between a telecommunication network and a telecommunication device.

FIG. 1 shows a block diagram of an adjunct arrangement 1 according to the present invention coupled between a telecommunication network 2 such as an analog public switched telephone network and a telecommunication device 3 such as an analog telephone set. Further shown are telecommunication devices 4 and 5 coupled to the network 2. The adjunct arrangement 1 comprises a relay of which relay contacts 6 and 7 are shown, and further a first impedance $Z_1$ and a second impedance $Z_2$, the first impedance $Z_1$ having a low impedance value with respect to an impedance value of the second impedance $Z_2$ in a given frequency range, e.g. a telephone voice band of 300–3400 Hz. The first impedance Z preferably is a capacitor, and the second impedance $Z_2$ preferably is a gyrator circuit implementing an electronic coil. The relay preferably is of the set-reset type so as to save power. The relay contacts are shown in a position that the telecommunication device operates in a normal or voice mode. When the relay is actuated, the relay contacts 6 and 7 take a different position so as to change the mode from voice mode to mute mode while at the same time allowing data to be exchanged between the adjunct arrangement and the telecommunication network 2. In the voice mode, the impedance $Z_2$ is bridged by the relay contact 6, the impedance $Z_1$ is disconnected from the set 3, and the relay contact 7 is open. In the mute mode, the impedance $Z_1$ is switched parallel to the telecommunication device 3 and in series with the impedance $Z_2$, the series circuit of the impedances $Z_1$ and $Z_2$ being switched parallel to the network 2. In the mute mode, the relay contact 7 is closed. The required muting is obtained by making $Z_2 >> Z_1$. The electronic coil or gyrator $Z_2$ has a very low impedance for DC and still a low impedance with respect to the capacitor $Z_1$ in the relevant frequency range. Further shown are the network's impedance $Z_4$, set's impedance $Z_5$, and a line current detector 8. For data exchange in the mute mode, the adjunct arrangement 1 comprises a receiver 9 and a transmitter 10 controlled by a controller 11 which is also coupled to the line current detector 8. In a different embodiment, the receiver may be directly connected to the telephone line instead of via the relay contact 7, and the line current detector 8 may be in the path of the relay contact 6 instead of in the path of the telephone line. This embodiment has the advantages that the receiver 9 can always listen to the telephone line and that in mute mode no line current has to be sensed. When transmitting, the correct line impedance is obtained by means of the impedance $Z_3$, a series circuit of a resistor 12 and a capacitor 13. The network 2 supports voice service and an off-hook signalling data service, i.e. a data service that interrupts a voice service for short periods of time, typically 5 seconds at a maximum each time the voice service is interrupted. A typical data service is transmission of call waiting identification data by the network 2. When a call is going on subscribers operating the telephone sets 3 and 4, a subscriber operating the telephone set 5 could intrude this call if the network supports a call waiting service. The subscriber operating the set 5 wants to make a telephone call to the subscriber or party operating the set 3. The network 2 detects this intrusion of the call between the sets 3 and 4 and sends a call alert signal to the adjunct arrangement 1 indicating that a third party is calling. The adjunct arrangement 1 detects this call alert signal and actuates the relay so as to switch the relay contacts 6 and 7 to the mute position. In an embodiment, the adjunct arrangement sends a DTMF tone (Dual Tone Multiple Frequency, e.g. 2130 Hz and 2750 Hz) to the network 2 via the closed relay contact 7 so as to acknowledge the reception of the call alert signal. Thereafter, the receiver 9, for instance an FSK-receiver (Frequency Shift Keying demodulation, e.g. 1200 and 2100 Hz for respective modulation of a first logic value and a second logic value), receives an FSK-data-stream from the network 2 containing information as to the name and/or number of the party intruding the ongoing call. Advantageously, the adjunct arrangement 1 comprises an LCD (Liquid Crystal Display) (not shown in detail) for displaying the intruding party's name and/or number. After reception of this information, the adjunct arrangement switches over from mute mode to voice mode. The adjunct arrangement 1 can also be programmed so as to allow more elaborate data transfer or to support other services. The adjunct arrangement 1 can be coupled to a computer (not shown in detail) for allowing data transfer between parties in a burst mode of operation. In this way, ordinary analog telephone sets can be made suitable for all kinds of data transfer during voice calls just by providing an adjunct arrangement to each of the parties desiring to make such communications.

Figure 2:
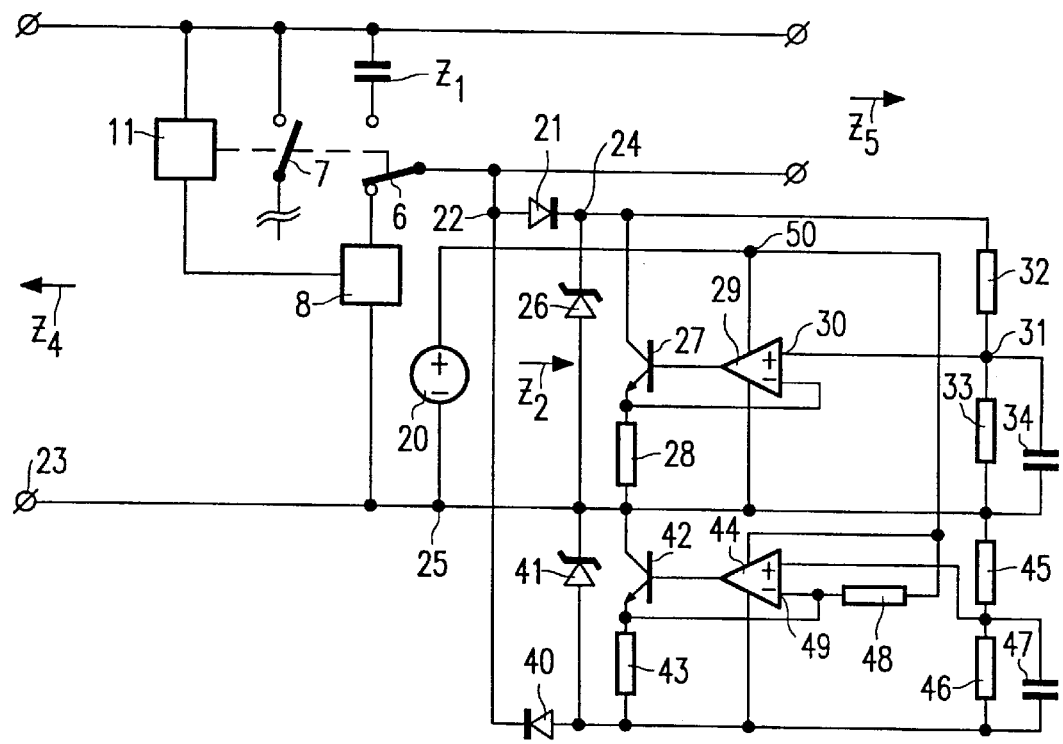
FIG. 2 shows a detailed diagram of an adjunct arrangement according to the present invention.

FIG. 2 shows a detailed diagram of the adjunct arrangement 1 according to the present invention, the impedance $Z_2$ being a gyrator fed by a battery. The gyrator comprises two substantially equal parts, one part for positive line currents and one part for negative line currents. The part for positive line currents comprises a diode 21 coupled with a first terminal 22 between the relay contact 6 and a network line terminal 23 via the current detector 8, and coupled with a second terminal 24 to a terminal 25 of the minus pole of the battery 20 via a zener diode 26 typically having a zener voltage of 20V. Parallel to the zener diode 26 a main current path of a transistor 27 is switched of which the emitter is coupled to the terminal 25 via a resistor 28. The basis of the transistor 27 is controlled by an operational amplifier 29 fed by the battery 20. A positive input 30 of the op amp 29 is coupled to a tap 31 of a voltage divider formed by resistors 32 and 33 switched between the terminals 24 and 25. A capacitor 34 is switched parallel to the resistor 34. Similarly, the part of the gyrator for negative line currents comprises a diode 40, a zener diode 41, a transistor 42, a resistor 43, an op amp 44, a voltage divider formed by resistors 45 and 46, and a capacitor 47, and further a resistor 48 coupled between a negative input 49 of the op amp 44 and a positive pole 50 of the battery 20. The battery 20 feeds the op amps 29 and 44, and supplies base currents for the transistors 27 and 42 that are otherwise fed by the line currents of the network 2. Herewith, as compared to known adjunct arrangements, the adjunct arrangement 1 according to the present invention has greatly reduced power consumption. The DC-operating point of the transistor 27 is adjusted as follows. The voltage at the terminal 24 is divided by means of the voltage divider formed by the resistors 32 and 33 and the divided voltage appears at the positive input 30 of the op amp 29. Because of the property of op amps to regulate their voltage between input terminals to zero, this divided voltage also appears at the emitter of the transistor 27 of which the DC-current of its main current path is then simply determined by Ohm's law, namely the voltage across the resistor 28 divided by the resistor value of the resistor 28. The capacitor 34 is used for filtering an AC-line ripple voltage. The relay coil (not shown in detail) is fed from the battery 20, preferably via a current source.

I claim:

1. An adjunct arrangement for a telecommunication device to be coupled between a telecommunication network supporting voice and data services and the telecommunication device, which adjunct arrangement comprises switching means for switching the telecommunication device between a mute mode and a voice mode, whereby the data service is supported when the telecommunication device is in the mute mode, characterized in that the adjunct arrangement comprises a first impedance and a second impedance in the form of a gyrator circuit, the first impedance having a low impedance value with respect to an impedance value of the second impedance in a given frequency range, the switching means being arranged for switching the first impedance parallel to the telecommunication device, and for switching the second impedance and the telecommunication device in series, and parallel to the telecommunication network, when the telecommunication device is switched into the mute mode.

2. An adjunct arrangement according to claim 1, wherein the first impedance is a capacitor.

3. An adjunct arrangement according to claim 1, wherein the adjunct arrangement comprises a third impedance having an impedance value substantially equal to an impedance value of the telecommunication network at the side of the adjunct arrangement, the switching means being arranged to switch the third impedance parallel to the telecommunication network when the telecommunication device is switched into the mute mode.

4. An adjunct arrangement according to claim 1, wherein the switching means include a relay of a set-reset type.

5. An adjunct arrangement for a telecommunication device to be coupled between a telecommunication network supporting voice and data services and the telecommunication device, the adjunct arrangement comprising a first impedance, a second impedance in the form of a gyrator circuit, data communication means, and switching means for switching the first impedance parallel to the telecommunication device, the second impedance and the telecommunication device in series, the series switched second impedance and telecommunication device parallel to the telecommunication network, and the data communication means to the telecommunications network, when the telecommunication device is in the mute mode, and for switching the telecommunication device to the telecommunication network, when the telecommunication device is in the voice mode, in a voice frequency band the first impedance having a low impedance with respect to the impedance of the second impedance.

* * * * *